United States Patent
Zou

(10) Patent No.: US 11,088,828 B2
(45) Date of Patent: Aug. 10, 2021

(54) BLOCKCHAIN-BASED DATA EVIDENCE STORAGE METHOD AND APPARATUS

(71) Applicant: ADVANCED NEW TECHNOLOGIES CO., LTD., Grand Cayman (KY)

(72) Inventor: Xueqing Zou, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/848,503

(22) Filed: Apr. 14, 2020

(65) Prior Publication Data

US 2020/0244440 A1 Jul. 30, 2020

Related U.S. Application Data

(63) Continuation of application No. PCT/CN2020/071672, filed on Jan. 13, 2020.

(30) Foreign Application Priority Data

Jul. 18, 2019 (CN) .......................... 201910651420.9

(51) Int. Cl.
*H04L 9/06* (2006.01)
*H04L 29/08* (2006.01)
*G06F 21/16* (2013.01)

(52) U.S. Cl.
CPC ............ *H04L 9/0637* (2013.01); *G06F 21/16* (2013.01); *H04L 9/0643* (2013.01); *H04L 67/1097* (2013.01); *H04L 2209/608* (2013.01)

(58) Field of Classification Search
CPC ........... H04L 67/1097; H04L 2209/608; H04L 9/06–9/0643; G06F 21/16
See application file for complete search history.

(56) References Cited

U.S. PATENT DOCUMENTS

| 9,331,856 B1 | 5/2016 | Song |
| 10,176,309 B2 | 1/2019 | Tormasov et al. |

(Continued)

FOREIGN PATENT DOCUMENTS

| CN | 106897348 A | 6/2017 |
| CN | 107145768 A | 9/2017 |

(Continued)

OTHER PUBLICATIONS

Bhowmik, Deepayan, and Tian Feng. "The multimedia blockchain: A distributed and tamper-proof media transaction framework." 2017 22nd International Conference on Digital Signal Processing (DSP). IEEE, 2017. (Year: 2017).*

(Continued)

*Primary Examiner* — Madhuri R Herzog

(57) ABSTRACT

Embodiments of the present application provide a blockchain-based data evidence storage method, a blockchain-based data check method, and relevant apparatuses. The data evidence storage method comprises: performing irreversible encryption on data content of a target file to obtain irreversibly encrypted data of the target file; storing the irreversibly encrypted data in a blockchain and obtaining on-chain evidence storage information of the irreversibly encrypted data; generating a digital watermark of the on-chain evidence storage information; embedding the digital watermark into the target file; and storing the target file embedded with the digital watermark of the on-chain evidence storage information.

20 Claims, 3 Drawing Sheets

(56) References Cited

U.S. PATENT DOCUMENTS

| | | | |
|---|---|---|---|
| 10,333,696 B2 | 6/2019 | Ahmed | |
| 10,348,726 B2 | 7/2019 | Caluwaert | |
| 10,366,204 B2 | 7/2019 | Tanner, Jr. et al. | |
| 10,447,483 B1* | 10/2019 | Su | G06F 8/654 |
| 2002/0085737 A1* | 7/2002 | Kitamura | G06T 1/0021 |
| | | | 382/100 |
| 2003/0215111 A1* | 11/2003 | Zhang | H04N 1/32154 |
| | | | 382/100 |
| 2015/0170112 A1 | 6/2015 | DeCastro | |
| 2016/0203572 A1 | 7/2016 | McConaghy et al. | |
| 2018/0048469 A1 | 2/2018 | Ateniese et al. | |
| 2018/0068091 A1 | 3/2018 | Gaidar et al. | |
| 2018/0096175 A1 | 4/2018 | Schmeling et al. | |
| 2018/0121635 A1* | 5/2018 | Tormasov | H04L 9/3297 |
| 2018/0121923 A1 | 5/2018 | Uhr et al. | |
| 2018/0227130 A1* | 8/2018 | Ebrahimi | H04L 9/0643 |
| 2018/0307859 A1 | 10/2018 | LaFever et al. | |
| 2018/0343128 A1 | 11/2018 | Uhr et al. | |
| 2018/0374173 A1 | 12/2018 | Chen et al. | |
| 2019/0182033 A1 | 6/2019 | Li et al. | |
| 2019/0294761 A1 | 9/2019 | Kim et al. | |
| 2019/0294822 A1* | 9/2019 | Hennebert | G06F 21/6254 |
| 2019/0373339 A1 | 12/2019 | Bradley et al. | |
| 2019/0385269 A1 | 12/2019 | Zachary | |
| 2020/0012765 A1* | 1/2020 | Smaiely | G06Q 20/1235 |

FOREIGN PATENT DOCUMENTS

| | | | | |
|---|---|---|---|---|
| CN | 107819777 A | 3/2018 | | |
| CN | 107545181 A | 10/2018 | | |
| CN | 109711120 A | 5/2019 | | |
| CN | 109711836 A | 5/2019 | | |
| CN | 109740316 A | 5/2019 | | |
| CN | 109740384 A | 5/2019 | | |
| CN | 110427774 A | 11/2019 | | |
| EP | 3379440 A1 | 9/2018 | | |
| WO | WO-2019088688 A1 * | 5/2019 | | G06F 21/16 |

OTHER PUBLICATIONS

Kerr, Michael, Fengling Han, and Ron van Schyndel. "A blockchain implementation for the cataloguing of cctv video evidence." 2018 15th IEEE International Conference on Advanced Video and Signal Based Surveillance (AVSS). IEEE, 2018. (Year: 2018).*

Meng, Zhaoxiong, et al. "Design scheme of copyright management system based on digital watermarking and blockchain." 2018 IEEE 42nd Annual Computer Software and Applications Conference (COMPSAC). vol. 2. IEEE, 2018. (Year: 2018).*

First Search for Chinese Application No. 201910651420.9 dated May 19, 2020.

First Office Action for Chinese Application No. 201910651420.9 dated May 27, 2020.

Supplementary Search for Chinese Application No. 201910651420.9 dated Jun. 29, 2020.

Second Office Action for Chinese Application No. 201910651420.9 dated Jul. 3, 2020.

Written Opinion and International Search Report for PCT Application No. PCT/CN2020/071672 dated Apr. 24, 2020.

Supplementary Search for Chinese Application No. 201910651420.9 dated Oct. 26, 2020.

* cited by examiner

BLOCKCHAIN-BASED DATA EVIDENCE STORAGE METHOD AND APPARATUS

CROSS REFERENCE TO RELATED APPLICATIONS

This application is a continuation application of International Patent Application No. PCT/CN2020/071672, filed on Jan. 13, 2020, which claims priority to Chinese Patent Application No. 201910651420.9, filed on Jul. 18, 2019. The entire content of the above referenced applications are incorporated herein by reference.

TECHNICAL FIELD

Embodiments of the present application relate to the technical field of data processing, and in particular, to a blockchain-based data evidence storage method, a blockchain-based data check method, and relevant apparatuses.

BACKGROUND

Along with the development of blockchain technologies, there are more and more blockchain-based applications, including data evidence storage services. According to existing data evidence storage methods, a service terminal uploads irreversibly encrypted data of a file to a blockchain for recording. After the recording is successful, the blockchain feeds on-chain evidence storage information of the irreversibly encrypted data back to the service terminal. Here, the irreversibly encrypted data is obtained through calculation based on data content of the file. Once the data content of the file changes, the calculated irreversibly encrypted data changes accordingly. Therefore, the service terminal may check the current data content of the file by retrieving, based on the on-chain evidence storage information, the irreversibly encrypted data calculated from the original data content of the file.

In the current technologies, the service terminal stores the on-chain evidence storage information independently (e.g., separated from the file). On the one hand, it is difficult to maintain the on-chain evidence storage information. For example, the service terminal needs to construct a mapping relationship between the file and the on-chain evidence storage information. Moreover, if the file needs to be relocated, the management of the corresponding on-chain evidence storage information must be considered. On the other hand, when checking data content of the file, corresponding on-chain evidence storage information needs to be found through matching, and this process is cumbersome. Moreover, if the file and the on-chain evidence storage information are not stored in the same physical storage medium, unnecessary troubles may be encountered. In light of this, there is currently an urgent need to solve the technical problem of how to more quickly and conveniently achieve data evidence storage service and data check service.

SUMMARY

The objective of embodiments of the present application is to provide a blockchain-based data evidence storage method, a blockchain-based data check method, and relevant apparatuses, which can more quickly and conveniently achieve data evidence storage service and data check service.

To achieve the above-described objective, the embodiments of the present application are implemented as follows.

According to a first aspect, a blockchain-based data evidence storage method is provided, comprising: performing irreversible encryption on data content of a target file to obtain irreversibly encrypted data of the target file; storing the irreversibly encrypted data in a blockchain and obtaining on-chain evidence storage information of the irreversibly encrypted data; generating a digital watermark of the on-chain evidence storage information; embedding the digital watermark into the target file; and storing the target file embedded with the digital watermark of the on-chain evidence storage information.

In some embodiments, the storing the irreversibly encrypted data in a blockchain comprises: submitting, via a blockchain interface, a blockchain transaction comprising the irreversibly encrypted data in the blockchain.

In some embodiments, the on-chain evidence storage information comprises a block identifier of a block storing the irreversibly encrypted data in the blockchain.

In some embodiments, the performing irreversible encryption on data content of a target file comprises: performing, based on an irreversible hash algorithm, hash calculation on the data content of the target file to obtain file hash of the target file, and the irreversibly encrypted data comprises the file hash.

In some embodiments, the embedding the digital watermark into the target file comprises: embedding the digital watermark of the on-chain evidence storage information into a display of the target file on a digital device.

In some embodiments, the embedding the digital watermark of the on-chain evidence storage information into a display of the target file on a digital device comprises: dividing the display of the target file into a plurality of content blocks; obtaining a frequency coefficient corresponding to each of the content blocks by performing Discrete Cosine Transform (DCT) operation on the content blocks; splitting the digital watermark into one or more pieces; and embedding the one or more pieces into one or more of the content blocks based on the frequency coefficients of the one or more of the content blocks.

In some embodiments, the one or more of the content blocks comprise content blocks with frequency coefficients greater than a preset threshold.

In some embodiments, the embedding the one or more pieces into one or more of the content blocks based on the frequency coefficients of the one or more of the content blocks comprises: sorting the plurality of content blocks in a descending order based on the frequency coefficients; identifying one or more of the top content blocks based on a preset percentage; and embedding the one or more pieces into the identified one or more top content blocks.

In some embodiments, the display of the target file on a digital device comprises a first display layer displaying the target file, and the embedding the digital watermark of the on-chain evidence storage information into a display of the target file on a digital device comprises: embedding the digital watermark into a second display layer above the first display layer of the target file.

In some embodiments, when the data content of the target file needs to be checked, the method further comprises: obtaining the on-chain evidence storage information based on the digital watermark embedded in the target file; obtaining, based on the on-chain evidence storage information, the irreversibly encrypted data of the target file recorded in the blockchain; performing the irreversible encryption on the data content of the target file to obtain new irreversibly encrypted data of the target file, wherein the data content of the target file excludes the on-chain evidence storage information; and checking if the irreversibly encrypted data of the target file and the new irreversibly encrypted data are consistent.

According to the solutions of the embodiments of the present application, after the irreversibly encrypted data of the target file is uploaded to a blockchain, the on-chain evidence storage information of the irreversibly encrypted data is embedded into the target file such that the on-chain evidence storage information is stored together with the target file. On the one hand, the difficulty in maintaining the on-chain evidence storage information is decreased, which makes it hard to lose the on-chain evidence storage information. On the other hand, when the on-chain evidence storage information needs to be used to check data content of the target file, the on-chain evidence storage information can be directly extracted and obtained from the target file, thereby making the operations significantly more convenient.

BRIEF DESCRIPTION OF THE DRAWINGS

To more clearly describe the technical solutions of the embodiments of the present application or of the current technologies, the to-be-used accompanying drawings in the description of the embodiments or the current technologies will be briefly described below. Apparently, the accompanying drawings in the description below are merely some of the embodiments of the present application. Other drawings may be obtained by one of ordinary skill in the art without creative effort according to these accompanying drawings.

DETAILED DESCRIPTION

To enable those skilled in the technical field to better understand the technical solutions of the present application, the technical solutions of the embodiments of the present application will be completely and thoroughly described below with reference to the accompanying drawings in the embodiments of the present application. Apparently, the described embodiments are merely some, but not all, embodiments of the present application. All other embodiments obtainable by a person skilled in the art without creative effort, based on some embodiments of the present application, shall fall within the protection scope of the present application.

As described above, in existing solutions for blockchain-based data evidence storage, a service terminal stores on-chain evidence storage information and files separately. On the one hand, it is difficult to maintain the on-chain evidence storage information. For example, the service terminal needs to construct a mapping relationship between files and on-chain evidence storage information. Moreover, if a file needs to be relocated, the management of the corresponding on-chain evidence storage information must be considered. On the other hand, when checking data content of a file, corresponding on-chain evidence storage information needs to be found through matching, and this process is cumbersome. Moreover, if the file and the on-chain evidence storage information are not stored in the same physical storage medium, unnecessary troubles may be caused.

In light of the above-described problems, the present application is intended to provide a technical solution that can more quickly and conveniently achieve data evidence storage service and data check service.

Figure 1:
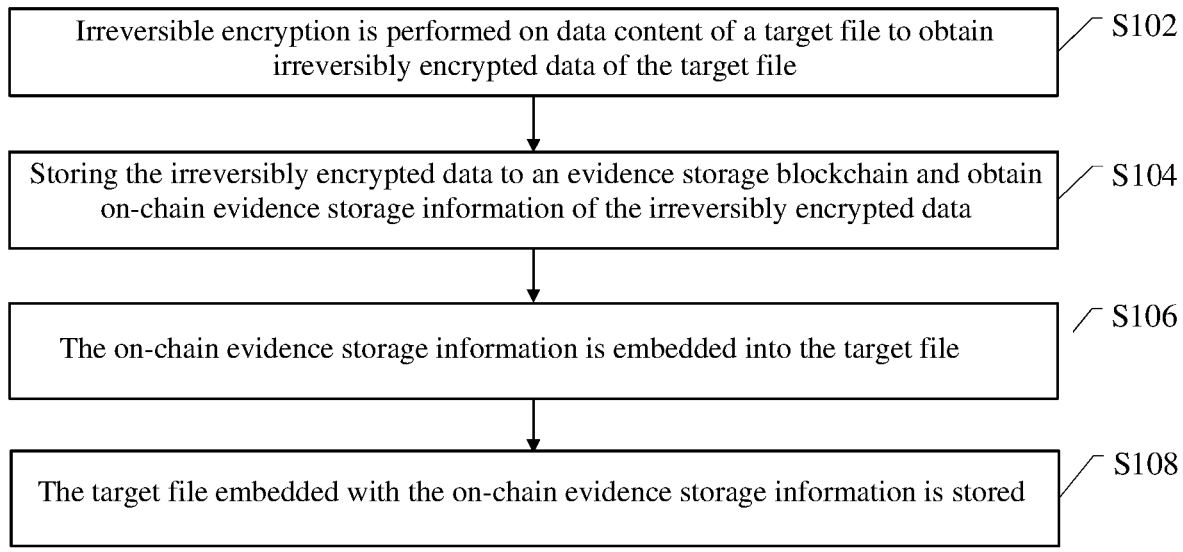
FIG. 1 is a schematic flow chart of the data evidence storage method according to some embodiments of the present application.

FIG. 1 is a flow chart of the blockchain-based data evidence storage method according to some embodiments of the present application. The method shown in FIG. 1 may be implemented by a corresponding apparatus in the description below, and the method comprises the following steps.

In Step S102, irreversible encryption is performed on data content of a target file to obtain irreversibly encrypted data of the target file. Here, the method for performing the irreversible encryption is not limited by the embodiments of the present application.

In some embodiments, hash calculation may be performed based on a hash algorithm (e.g., a message digest algorithm, cyclic redundancy check, etc.) on the data content of the target file to obtain digest information of the target file, and the digest information may serve as the irreversibly encrypted data of the target file.

In Step S104, the irreversibly encrypted data is stored in (e.g., uploaded to) an evidence storage blockchain (e.g., a blockchain storing evidence) and obtain on-chain evidence storage information of the irreversibly encrypted data.

For example, in this step, a transaction carrying the irreversibly encrypted data may be submitted, via a blockchain interface, to the evidence storage blockchain such that the evidence storage blockchain records the irreversibly encrypted data according to an existing procedure of uploading data in a transaction to a blockchain.

In Step S106, the on-chain evidence storage information is embedded into the target file. Here, the method for embedding the on-chain evidence storage information is not limited by the embodiments of the present application.

In some embodiments, the on-chain evidence storage information may be converted to a digital watermark. Then, the digital watermark of the on-chain evidence storage information may be embedded, based on a watermark embedding technology, into the target file.

In Step S108, the target file embedded with the on-chain evidence storage information is stored. The on-chain evidence storage information always accompanies the target file and won't be changed or destroyed when the target file is used normally (e.g., operated with permitted actions).

In some embodiments, after the irreversibly encrypted data of the target file is uploaded to a blockchain, the on-chain evidence storage information of the irreversibly encrypted data is embedded into the target file such that the on-chain evidence storage information is stored together with the target file. On the one hand, the difficulty in maintaining the on-chain evidence storage information is decreased, and it is not easy to lose the on-chain evidence storage information. On the other hand, when the on-chain evidence storage information needs to be used to check data content of the target file, the on-chain evidence storage information can be directly extracted and obtained from the target file, thereby making the operations significantly more convenient.

For example, the method according to some embodiments of the present application utilize a distributed data storage technology of decentralized, anti-loss, and tamper-proof blockchains to realize recording and searching of the irreversibly encrypted data of the target file. After the irreversibly encrypted data is successfully uploaded to a blockchain, the on-chain evidence storage information is embedded, based on a watermark embedding technology, into the target file such that the on-chain evidence storage information may be stored together with the target file in a uniform manner as watermarks. Watermarks have a characteristic that they are not easily detected. Therefore, the embedded irreversibly encrypted data does not affect normal use of the original carrier, i.e., the target file. Moreover, the embedded irreversibly encrypted data cannot be easily detected and destroyed by others.

Here, the main flow of the method according to some embodiments of the present application may comprise the following steps.

In Step I, when evidence storage needs to be performed on the target file, the service terminal performs, based on an irreversible hash algorithm, hash calculation on the data content of the target file to obtain digest information of the target file (i.e., the irreversibly encrypted data).

In Step II, the service terminal submits, via a blockchain interface, a transaction carrying the digest information to the evidence storage blockchain, and obtains the on-chain evidence storage information of the digest information.

Here, the on-chain evidence storage information may comprise a block identifier of a block storing the irreversibly encrypted data in the evidence storage blockchain. The service terminal may find, based on the block identifier, a corresponding block from the evidence storage blockchain, and then extract the irreversibly encrypted data recorded in the block.

In Step III, after the on-chain evidence storage information is obtained, the service terminal generates a digital watermark of the on-chain evidence storage information, and embeds, based on a watermark embedding technology, the digital watermark of the on-chain evidence storage information into the target file.

In this step, the digital watermark may be embedded into the target file in an implicit manner. For example, the content of the target file presented on a digital device may be first divided into blocks to obtain at least one content block. Then, Discrete Cosine Transform (DCT) calculation is performed on the content blocks to obtain a frequency coefficient corresponding to each content block. The frequency coefficient may reflect the energy of a content block in the presentation interface. Human eyes are more sensitive to low frequency portions than to high frequency portions. If embedded in a low frequency portion, the digital watermark can be easily perceived, and the normal display of the target file is affected. Therefore, to make it difficult to perceive the digital watermark, the digital watermark may be split and embedded in content blocks with relatively high frequency coefficients. For example, the digital watermark is split into pieces and embedded the pieces in content blocks with frequency coefficients greater than a preset standard. Alternatively, the content blocks are sorted in a descending order based on the frequency coefficients, the digital watermark is split into pieces and embedded into one or more of the content blocks with top frequency coefficients, where the content blocks are selected based on a preset percentage (e.g., the content blocks with the top 15% of the frequency coefficients).

In addition, in this step, the digital watermark may also be embedded into the target file in an explicit manner. For example, the target file is presented on a digital device in layers. In this step, the digital watermark may be embedded into other display layers above the display layer of the original content of the target file.

In Step IV, the service terminal stores the target file embedded with the on-chain evidence storage information. In some embodiments, the on-chain evidence storage information always accompanies the target file. Therefore, the service terminal does not need to configure an extra mapping relationship between the target file and the on-chain evidence storage information. If the target file needs to be transferred later, there is no need to consider how to process the on-chain evidence storage information such that the maintenance becomes simpler and more practical.

Figure 2:
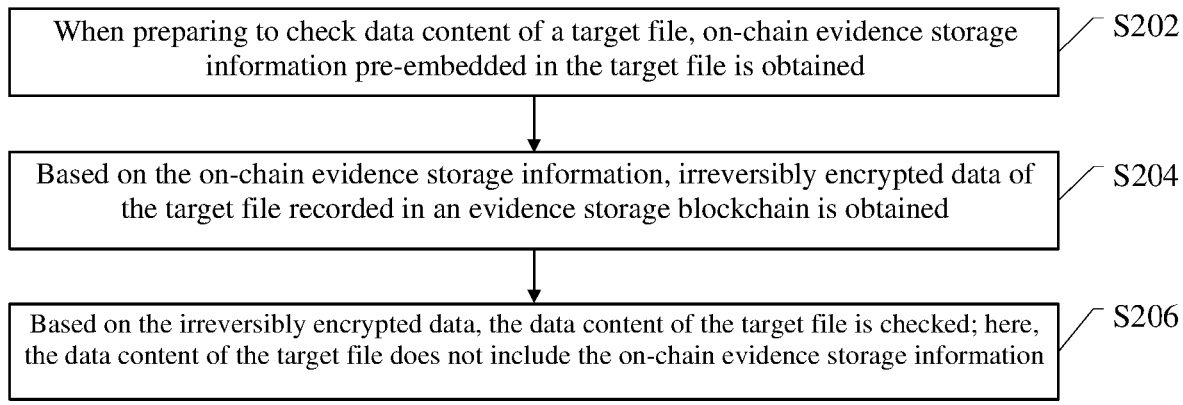
FIG. 2 is a schematic flow chart of the data check method according to some embodiments of the present application.

FIG. 2 is a flow chart of the blockchain-based data check method according to some embodiments of the present application. The method shown in FIG. 2 may be implemented by a corresponding apparatus in the description below, and the method comprises the following steps.

In Step S202, when preparing to check data content of a target file, on-chain evidence storage information pre-embedded in the target file is obtained. In Step S204, based on the on-chain evidence storage information, irreversibly encrypted data of the target file recorded in an evidence storage blockchain is obtained. In this step, the on-chain evidence storage information may be submitted, via a blockchain interface, to the evidence storage blockchain, so as to obtain the irreversibly encrypted data of the target file previously recorded in the evidence storage blockchain. In Step S206, based on the irreversibly encrypted data, the data content of the target file is checked; here, the data content of the target file does not include the on-chain evidence storage information.

In this step, irreversible encryption is performed on the data content of the target file to obtain locally generated irreversibly encrypted data of the target file. Then, the locally generated irreversibly encrypted data is compared with the irreversibly encrypted data obtained from the evidence storage blockchain. If the two are consistent, the check is successful, and if the two are inconsistent, the check is failure.

In some embodiments, the target file is embedded with the on-chain evidence storage information of the irreversibly encrypted data obtained through calculation based on the data content of the target file. When the data content of the target file needs to be checked, the on-chain evidence storage information may be directly obtained by parsing the target file (e.g., based on the digital watermarks of the on-chain evidence storage information embedded in the target file), and the irreversibly encrypted data for the check may be retrieved, based on the on-chain evidence storage information, from the evidence storage blockchain. Since the operations are more convenient and faster, the solutions are more practical.

The above-described data evidence storage method and data check method will be described in detail below with reference to an exemplary application scenario.

In this application scenario, assuming that a user needs to perform evidence storage on a target file, a personal device may be used to call a programming interface of an application for evidence storage to perform hash calculation on the data content of the target file to obtain original digest information TxHash of the target file.

Then, the user uses the personal device to access a blockchain interface of the evidence storage blockchain, so as to submit a transaction carrying TxHash to the evidence storage blockchain.

The evidence storage blockchain triggers, based on the above-described transaction, a pre-deployed smart contract to initiate an uploading-to-blockchain operation on TxHash in the transaction. After TxHash has been successfully uploaded to the blockchain, the corresponding on-chain evidence storage information is fed back to the personal device of the user.

Subsequently, the user uses the personal device to convert the on-chain evidence storage information fed back by the evidence storage blockchain into a digital watermark and to embed the digital watermark into the target file for unified storage. It should be understood that normal edits to the data content of the target file do not cause variations of the embedded on-chain evidence storage information.

Assuming that the user hopes to check (e.g., verify, authenticate) the data content of the target file at a later time, the user may use the personal device to send the target file to a verification platform, and the verification platform performs the check (the check process may also be implemented at the personal device side of the user, which will not be elaborated here).

Upon receiving the target file, the verification platform parses the target file to extract the on-chain evidence storage information in the target file. Then, the verification platform submits, via a blockchain interface, the on-chain evidence storage information obtained from the parsing to the evidence storage blockchain, thereby retrieving TxHash recorded in the evidence storage blockchain.

Meanwhile, the verification platform may further perform hash calculation on the data content of the target file to obtain current digest information TxHash* of the target file.

After TxHash and TxHash* are obtained, the verification platform compares TxHash and TxHash*. If the two are consistent, the check is successful, and if the two are inconsistent, the check is failure.

Subsequently, the verification platform feeds a check result of the target file to the personal device of the user.

The methods according to the embodiments of the present application are described above. Proper variations may be made without departing from the above-described principles in the present specification, and these variations shall also fall within the scope of the embodiments of the present application.

Figure 3:
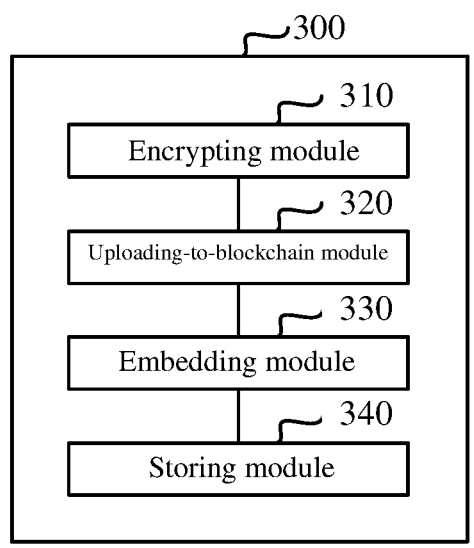
FIG. 3 is a schematic structure diagram of the data evidence storage apparatus according to some embodiments of the present application.

Corresponding to the above-described data evidence storage method, the embodiments of the present application further provide a blockchain-based data evidence storage apparatus 300, as shown in FIG. 3, comprising: an encrypting module 310 configured to perform irreversible encryption on data content of a target file to obtain irreversibly encrypted data of the target file; an uploading-to-blockchain module 320 configured to initiate an uploading-to-blockchain operation on the irreversibly encrypted data to store the irreversibly encrypted data to an evidence storage blockchain and obtain on-chain evidence storage information of the irreversibly encrypted data; an embedding module 330 configured to embed the on-chain evidence storage information into the target file; and a storing module 340 configured to store the target file embedded with the on-chain evidence storage information.

In some embodiments, after the irreversibly encrypted data of the target file is uploaded to a blockchain, the on-chain evidence storage information of the irreversibly encrypted data is embedded into the target file such that the on-chain evidence storage information is stored together with the target file. On the one hand, the difficulty in maintaining the on-chain evidence storage information is decreased, and it is not easy to lose the on-chain evidence storage information. On the other hand, when the on-chain evidence storage information needs to be used to check data content of the target file, the on-chain evidence storage information can be directly extracted and obtained from the target file, thereby making the operations significantly more convenient.

In some embodiments, when running, the uploading-to-blockchain module 320 is configured to, for example, submit, via a blockchain interface, a transaction carrying the irreversibly encrypted data to the evidence storage blockchain.

In some embodiments, the on-chain evidence storage information comprises a block identifier of a block storing the irreversibly encrypted data in the evidence storage blockchain.

In some embodiments, the encrypting module 310 is configured to, for example, perform, based on an irreversible hash algorithm, hash calculation on the data content of the target file to obtain file hash of the target file, the irreversibly encrypted data comprising the file hash.

In some embodiments, the embedding module 330 is configured to, for example, generate a digital watermark of the on-chain evidence storage information, and then embed, based on a watermark embedding technology, the digital watermark of the on-chain evidence storage information into content of the target file presented on a digital device.

Apparently, the data evidence storage apparatus according to the embodiments of the present application may serve as an entity to implement the above-described data evidence storage method shown in FIG. 1. Therefore, the data evidence storage apparatus may achieve the functions achieved by the data evidence storage method in FIG. 1, which will not be elaborated here since the principles are the same.

Figure 4:
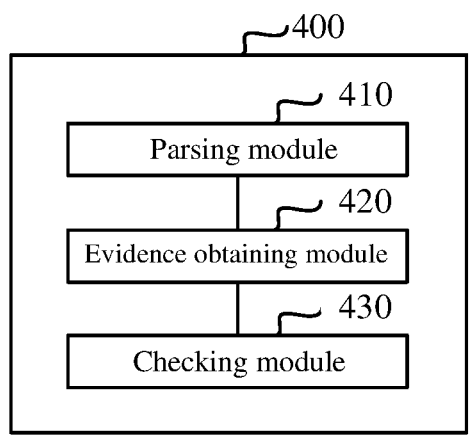
FIG. 4 is a schematic structure diagram of the data check apparatus according to some embodiments of the present application.

Corresponding to the above-described data check method, the embodiments of the present application further provide a blockchain-based data check apparatus 400, as shown in FIG. 4, comprising: a parsing module 410 configured to obtain on-chain evidence storage information pre-embedded in the target file; an evidence obtaining module 420 configured to obtain, based on the on-chain evidence storage information, irreversibly encrypted data of the target file recorded in an evidence storage blockchain; and a checking module 430 configured to check, based on the irreversibly encrypted data, the data content of the target file; here, the data content of the target file does not include the on-chain evidence storage information.

In some embodiments, when the data content of the target file needs to be checked, the on-chain evidence storage information may be directly obtained by parsing the target file, and the irreversibly encrypted data for the check may be retrieved, based on the on-chain evidence storage information, from the evidence storage blockchain. Since the operations are more convenient and faster, the solutions are more practical.

Apparently, the data check apparatus according to the embodiments of the present application may serve as an entity to implement the above-described data check method shown in FIG. 2. Therefore, the data check apparatus may achieve the functions achieved by the data check method in FIG. 2, which will not be elaborated here since the principles are the same.

Figure 5:
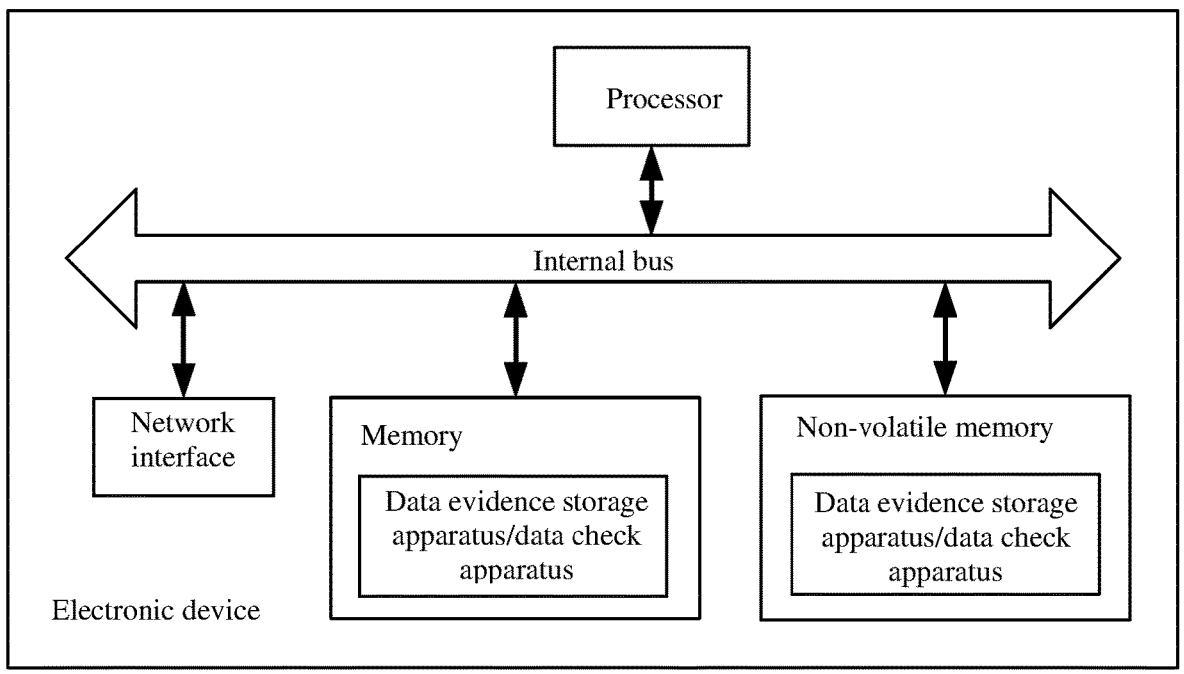
FIG. 5 is a schematic structure diagram of the electronic device according to some embodiments of the present application.

FIG. 5 is a schematic structure diagram of the electronic device according to some embodiments of the present application. Referring to FIG. 5, on a hardware level, the electronic device comprises a processor, and optionally may further comprise an internal bus, a network interface, and a storage device. Here, the storage device may comprise a memory, such as a Random-Access Memory (RAM) and may further comprise a non-volatile memory, such as at least one disk memory. The electronic device may further comprise hardware required by other transactions.

The processor, the network interface, and the storage device may be connected to each other via the internal bus. The internal bus may be an Industry Standard Architecture (ISA) bus, a Peripheral Component Interconnect (PCI) bus, or an Extended Industry Standard Architecture (EISA) bus. The bus may be divided into an address bus, a data bus, or a control bus. For ease of presentation, only one two-way arrow is used in FIG. 5, which does not represent only one bus or one type of buses.

The storage device is configured to store a program. For example, the program may comprise program codes, and the program codes comprise computer operation instructions. The storage device may comprise a memory and a non-volatile memory, and provide instructions and data to the processor.

The processor reads a corresponding computer program into the memory from the non-volatile memory and then runs the computer program to form the data evidence storage apparatus on the logic level. The processor executes the program stored in the memory and is configured, for example, to execute the following operations: performing irreversible encryption on data content of a target file to obtain irreversibly encrypted data of the target file; initiating an uploading-to-blockchain operation on the irreversibly encrypted data to store the irreversibly encrypted data to an evidence storage blockchain and obtain on-chain evidence storage information of the irreversibly encrypted data; embedding the on-chain evidence storage information into the target file; and storing the target file embedded with the on-chain evidence storage information.

Alternatively, the processor reads a corresponding computer program into the memory from the non-volatile memory and then runs the computer program to form the data check apparatus on the logic level. The processor executes the program stored in the memory and is configured, for example, to execute the following operations: obtaining, when preparing to check data content of a target file, on-chain evidence storage information pre-embedded in the target file; obtaining, based on the on-chain evidence storage information, irreversibly encrypted data of the target file recorded in an evidence storage blockchain; and checking, based on the irreversibly encrypted data, the data content of the target file; here, the data content of the target file does not include the on-chain evidence storage information.

Both the above-described data evidence storage method disclosed by the embodiment shown in FIG. 1 of the present application and the above-described blockchain-based data check method disclosed by the embodiment shown in FIG. 2 of the present application may be applied on a processor or may be implemented by a processor. The processor may be an integrated circuit chip with signal processing capabilities. In an implementation process, steps of the above-described methods may be completed by a hardware integrated logic circuit or an instruction in the form of software in the processor. The above-described processor may be a general-purpose processor, including a Central Processing Unit (CPU) and a Network Processor (NP) and the like, and may also be a Digital Signal Processor (DSP), an Application Specific Integrated Circuit (ASIC), a Field-Programmable Gate Array (FPGA) or other programmable logic devices, discrete gates, transistor logic devices, and discrete hardware components, which can implement or execute various methods, steps and logic block diagrams disclosed in the embodiments of the present application. The general-purpose processor may be a micro-processor, or the processor may be any conventional processor. Steps of the method disclosed with reference to the embodiments of the present application may be directly executed and completed by a hardware decoding processor or by a combination of hardware and software modules in a decoding processor. The software modules may be located in a mature storage medium in the art, such as a Random-Access Memory, a flash memory, a Read-Only Memory, a Programmable Read-Only Memory or an Electrically Erasable Programmable Memory, a register, and the like. The storage medium is located in the memory, and the processor reads information in the memory and completes steps of the above-described methods in combination with the hardware of the processor.

The electronic device according to the embodiments of the present application can achieve the functions achieved by the above-described apparatuses in the embodiments as shown in FIG. 1 and FIG. 2, which will not be elaborated here.

In addition to the software implementation, the electronic device according to the present application does not exclude other implementations, such as logic devices or a combination of software and hardware. In other words, the execution entities of the following processing flow are not limited to various logic units, but may also be hardware or logic devices.

Furthermore, the embodiments of the present application further provide a computer readable storage medium, wherein the computer readable storage medium stores one or more programs, and the one or more programs comprise instructions.

Here, when being executed by a portable electronic device comprising a plurality of applications, the instructions can cause the portable electronic device to implement the method in the embodiments as shown in FIG. 1, and for example, implement the following method: performing irreversible encryption on data content of a target file to obtain irreversibly encrypted data of the target file; initiating an uploading-to-blockchain operation on the irreversibly encrypted data to store the irreversibly encrypted data to an evidence storage blockchain and obtain on-chain evidence storage information of the irreversibly encrypted data; embedding the on-chain evidence storage information into the target file; and storing the target file embedded with the on-chain evidence storage information.

Alternatively, when being executed by a portable electronic device comprising a plurality of applications, the instructions can cause the portable electronic device to implement the method in the embodiments as shown in FIG. 2, and for example, implement the following method: obtaining, when preparing to check data content of a target file, on-chain evidence storage information pre-embedded in the target file; obtaining, based on the on-chain evidence storage information, irreversibly encrypted data of the target file recorded in an evidence storage blockchain; and checking, based on the irreversibly encrypted data, the data content of the target file; here, the data content of the target file does not include the on-chain evidence storage information.

When being executed by a portable electronic device comprising a plurality of applications, the above-described instructions can cause the above-described data evidence storage apparatus to achieve the functions in the embodiment shown in FIG. 1 or can cause the above-described data check apparatus to achieve the functions in the embodiment shown in FIG. 2, which will not be repeated here since the principles are the same.

One of ordinary skill in the art should understand that the embodiments of the present specification may be provided as a method, a system, or a computer program product. Therefore, the present specification may be implemented as a complete hardware embodiment, a complete software embodiment, or an embodiment combining software and hardware. Moreover, the present specification may be in the form of a computer program product implemented on one or more computer usable storage media (including, but not limited to, a disk memory, CD-ROM, an optical memory, etc.) comprising computer usable program codes.

Particular embodiments of the present specification are described above, and other embodiments fall within the scope of the appended claims. In some cases, actions or steps stated in the claims may be executed in an order different from those in the embodiments and can still achieve desired results. In addition, a process depicted in the accompanying drawings does not necessarily require the illustrated particular order or continuous order to achieve desired results. In some implementations, multi-task processing and parallel processing may be feasible or may be beneficial.

The above-described is merely embodiments of the present specification, which are not used to limit the present specification. To one of ordinary skill in the art, the present specification may have various modifications and variations. Any modification, equivalent substitution, or improvement made within the spirit and principle of the present specification shall be encompassed by the claims of the present specification.

What is claimed is:

1. A blockchain-based data evidence storage method, comprising:
    performing, by a computing device of a user, irreversible encryption on data content of a target file to obtain irreversibly encrypted data of the target file;
    submitting, by the computing device through a first blockchain interface of a blockchain, the irreversibly encrypted data in a blockchain transaction to the blockchain;
    receiving, by the computing device, on-chain evidence storage information of the irreversibly encrypted data;
    generating, by the computing device, a digital watermark of the on-chain evidence storage information;
    embedding, by the computing device, the digital watermark into the target file;
    storing, by the computing device, the target file embedded with the digital watermark of the on-chain evidence storage information;
    sending, by the computing device, the target file embedded with the digital watermark to a verification platform, wherein the digital watermark embedded in the target file comprises the on-chain evidence storage information;
    parsing, by the verification platform, the target file embedded with the digital watermark to extract the on-chain evidence storage information and the data content of the target file, wherein the on-chain evidence storage information comprises a block identifier of a block storing the irreversibly encrypted data in the blockchain;
    retrieving, by the verification platform through a second blockchain interface of the blockchain, the irreversibly encrypted data corresponding to the block identifier in the on-chain evidence storage information;
    performing, by the verification platform, the irreversible encryption on the data content of the target file to obtain new irreversibly encrypted data of the target file, wherein the data content of the target file excludes the on-chain evidence storage information;
    verifying whether the irreversibly encrypted data of the target file and the new irreversibly encrypted data are consistent; and
    sending, by the verification platform, the verification result to the computing device of the user.

2. The method according to claim 1, wherein the submitting the irreversibly encrypted data in the blockchain comprises:
    submitting, via a blockchain interface, a blockchain transaction comprising the irreversibly encrypted data in the blockchain.

3. The method according to claim 1, wherein the performing irreversible encryption on the data content of a target file comprises:
    performing, based on an irreversible hash algorithm, hash calculation on the data content of the target file to obtain file hash of the target file, and
    the irreversibly encrypted data comprises the file hash.

4. The method according to claim 1, wherein the embedding the digital watermark into the target file comprises:
    embedding the digital watermark of the on-chain evidence storage information into a display of the target file on a digital device.

5. The method according to claim 4, wherein the embedding the digital watermark of the on-chain evidence storage information into a display of the target file on a digital device comprises:
    dividing the display of the target file into a plurality of content blocks;
    obtaining a frequency coefficient corresponding to each of the content blocks by performing DCT operation on the content blocks;
    splitting the digital watermark into one or more pieces; and
    embedding the one or more pieces into one or more of the content blocks based on the frequency coefficients of the one or more of the content blocks.

6. The method of claim 5, wherein the one or more of the content blocks comprise content blocks with frequency coefficients greater than a preset threshold.

7. The method of claim 5, wherein the embedding the one or more pieces into one or more of the content blocks based on the frequency coefficients of the one or more of the content blocks comprises:
    sorting the plurality of content blocks in a descending order based on the frequency coefficients;
    identifying one or more of the top content blocks based on a preset percentage; and
    embedding the one or more pieces into the identified one or more top content blocks.

8. The method of claim 4, wherein the display of the target file on a digital device comprises a first display layer displaying the target file, and
    the embedding the digital watermark of the on-chain evidence storage information into a display of the target file on a digital device comprises:
    embedding the digital watermark into a second display layer above the first display layer of the target file.

9. A system for blockchain-based data evidence storage, comprising one or more processors and one or more non-transitory computer-readable memories coupled to the one or more processors and configured with instructions executable by the one or more processors to cause the system to perform operations comprising:

performing, by a computing device of a user, irreversible encryption on data content of a target file to obtain irreversibly encrypted data of the target file;

submitting, by the computing device through a first blockchain interface of a blockchain, the irreversibly encrypted data in a blockchain transaction to the blockchain;

receiving, by the computing device, on-chain evidence storage information of the irreversibly encrypted data;

generating, by the computing device, a digital watermark of the on-chain evidence storage information;

embedding, by the computing device, the digital watermark into the target file;

storing, by the computing device, the target file embedded with the digital watermark of the on-chain evidence storage information;

sending, by the computing device, the target file embedded with the digital watermark to a verification platform, wherein the digital watermark embedded in the target file comprises the on-chain evidence storage information;

parsing, by the verification platform, the target file embedded with the digital watermark to extract the on-chain evidence storage information and the data content of the target file, wherein the on-chain evidence storage information comprises a block identifier of a block storing the irreversibly encrypted data in the blockchain;

retrieving, by the verification platform through a second blockchain interface of the blockchain, the irreversibly encrypted data corresponding to the block identifier in the on-chain evidence storage information;

performing, by the verification platform, the irreversible encryption on the data content of the target file to obtain new irreversibly encrypted data of the target file, wherein the data content of the target file excludes the on-chain evidence storage information;

verifying whether the irreversibly encrypted data of the target file and the new irreversibly encrypted data are consistent; and sending, by the verification platform, the verification result to the computing device of the user.

10. The system according to claim 9, wherein the embedding the digital watermark into the target file comprises:

embedding the digital watermark of the on-chain evidence storage information into a display of the target file on a digital device.

11. The system according to claim 10, wherein the embedding the digital watermark of the on-chain evidence storage information into a display of the target file on a digital device comprises:

dividing the display of the target file into a plurality of content blocks;

obtaining a frequency coefficient corresponding to each of the content blocks by performing DCT operation on the content blocks;

splitting the digital watermark into one or more pieces; and embedding the one or more pieces into one or more of the content blocks based on the frequency coefficients of the one or more of the content blocks.

12. The system according to claim 11, wherein the embedding the one or more pieces into one or more of the content blocks based on the frequency coefficients of the one or more of the content blocks comprises:

sorting the plurality of content blocks in a descending order based on the frequency coefficients;

identifying one or more of the top content blocks based on a preset percentage; and embedding the one or more pieces into the identified one or more top content blocks.

13. A non-transitory computer-readable storage medium for blockchain-based data evidence storage, configured with instructions executable by one or more processors to cause the one or more processors to perform operations comprising:

performing, by a computing device of a user, irreversible encryption on data content of a target file to obtain irreversibly encrypted data of the target file;

submitting, by the computing device through a first blockchain interface of a blockchain, the irreversibly encrypted data in a blockchain transaction to the blockchain;

receiving, by the computing device, on-chain evidence storage information of the irreversibly encrypted data;

generating, by the computing device, a digital watermark of the on-chain evidence storage information;

embedding, by the computing device, the digital watermark into the target file;

storing, by the computing device, the target file embedded with the digital watermark of the on-chain evidence storage information;

sending, by the computing device, the target file embedded with the digital watermark to a verification platform, wherein the digital watermark embedded in the target file comprises the on-chain evidence storage information;

parsing, by the verification platform, the target file embedded with the digital watermark to extract the on-chain evidence storage information and the data content of the target file, wherein the on-chain evidence storage information comprises a block identifier of a block storing the irreversibly encrypted data in the blockchain;

retrieving, by the verification platform through a second blockchain interface of the blockchain, the irreversibly encrypted data corresponding to the block identifier in the on-chain evidence storage information;

performing, by the verification platform, the irreversible encryption on the data content of the target file to obtain new irreversibly encrypted data of the target file, wherein the data content of the target file excludes the on-chain evidence storage information;

verifying whether the irreversibly encrypted data of the target file and the new irreversibly encrypted data are consistent; and sending, by the verification platform, the verification result to the computing device of the user.

14. The storage medium according to claim 13, wherein the embedding the digital watermark into the target file comprises:

embedding the digital watermark of the on-chain evidence storage information into a display of the target file on a digital device.

15. The storage medium according to claim 14, wherein the embedding the digital watermark of the on-chain evidence storage information into a display of the target file on a digital device comprises:

dividing the display of the target file into a plurality of content blocks;

obtaining a frequency coefficient corresponding to each of the content blocks by performing DCT operation on the content blocks;

splitting the digital watermark into one or more pieces; and embedding the one or more pieces into one or more of the content blocks based on the frequency coefficients of the one or more of the content blocks.

16. The storage medium according to claim 15, wherein the embedding the one or more pieces into one or more of the content blocks based on the frequency coefficients of the one or more of the content blocks comprises:

sorting the plurality of content blocks in a descending order based on the frequency coefficients;

identifying one or more of the top content blocks based on a preset percentage; and embedding the one or more pieces into the identified one or more top content blocks.

17. The system according to claim 9, wherein the performing irreversible encryption on the data content of a target file comprises:

performing, based on an irreversible hash algorithm, hash calculation on the data content of the target file to obtain file hash of the target file, and the irreversibly encrypted data comprises the file hash.

18. The system according to claim 11, wherein the one or more of the content blocks comprise content blocks with frequency coefficients greater than a preset threshold.

19. The storage medium according to claim 13, wherein the performing irreversible encryption on the data content of a target file comprises:

performing, based on an irreversible hash algorithm, hash calculation on the data content of the target file to obtain file hash of the target file, and the irreversibly encrypted data comprises the file hash.

20. The storage medium according to claim 15, wherein the one or more of the content blocks comprise content blocks with frequency coefficients greater than a preset threshold.

* * * * *